(12) United States Patent
Anandakumar et al.

(10) Patent No.: US 9,294,592 B2
(45) Date of Patent: Mar. 22, 2016

(54) METHOD AND SYSTEM FOR SERIALIZATION AND DESERIALIZATION (SERDES) FOR INTER-SYSTEM COMMUNICATIONS

(71) Applicant: MaxLinear, Inc., Carlsbad, CA (US)

(72) Inventors: Anand Anandakumar, San Diego, CA (US); Serdar Yilmaz, San Diego, CA (US); Chi-Foun Kuen, Vista, CA (US); Ravi Aripirala, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 0 days.

(21) Appl. No.: 14/684,605

(22) Filed: Apr. 13, 2015

(65) Prior Publication Data

US 2015/0326697 A1 Nov. 12, 2015

Related U.S. Application Data

(63) Continuation of application No. 13/646,139, filed on Oct. 5, 2012, now Pat. No. 9,008,119.

(60) Provisional application No. 61/544,938, filed on Oct. 7, 2011.

(51) Int. Cl.
    *H04L 29/06* (2006.01)
    *H04L 12/933* (2013.01)
    *H04J 3/06* (2006.01)

(52) U.S. Cl.
    CPC .............. *H04L 69/22* (2013.01); *H04J 3/0658* (2013.01); *H04L 49/101* (2013.01); *H04L 69/28* (2013.01)

(58) Field of Classification Search
    CPC ........ H04L 69/22; H04L 49/101; H04L 69/28; H04J 3/0658
    See application file for complete search history.

(56) References Cited

U.S. PATENT DOCUMENTS

| | | | |
|---|---|---|---|
| 7,110,396 B2* | 9/2006 | Saha | H04J 3/1617 370/356 |
| 7,353,284 B2* | 4/2008 | Agnoli | G06F 3/14 375/E7.014 |
| 2005/0010958 A1* | 1/2005 | Rakib | H04L 27/0002 725/111 |
| 2008/0089362 A1* | 4/2008 | Ezra | H04L 12/2801 370/493 |
| 2012/0176174 A1* | 7/2012 | Webb, III | G06F 1/0321 327/237 |

* cited by examiner

*Primary Examiner* — Chi H Pham
*Assistant Examiner* — Weibin Huang
(74) *Attorney, Agent, or Firm* — McAndrews, Held & Malloy, Ltd.

(57) ABSTRACT

An integrated circuit may comprise a tuner operable to digitize a band of frequencies comprising a plurality of television channels, a crossbar operable to select one or more of the plurality of television channels output by the tuner, a plurality of demodulators operable to receive the selected one or more television channels from the crossbar and demodulate the selected one or more television channels to recover a plurality of transport streams, a transport module operable to multiplex the plurality of transport streams into a single packet stream, and a framer operable to: encapsulate packets of the plurality of transport streams into transport stream frames of a serial datastream, and insert filler frames into the serial datastream after every Nth transport stream frame of the serial datastream, where N is an integer.

18 Claims, 7 Drawing Sheets

US 9,294,592 B2

METHOD AND SYSTEM FOR SERIALIZATION AND DESERIALIZATION (SERDES) FOR INTER-SYSTEM COMMUNICATIONS

CLAIM OF PRIORITY

This patent application is a continuation of U.S. patent application Ser. No. 13/646,139 filed on Oct. 5, 2012 (now U.S. Pat. No. 9,008,119) and also makes reference to, claims priority to and claims benefit from U.S. Provisional Patent Application Ser. No. 61/544,938 entitled "M&S for SERDES Communications" and filed on Oct. 7, 2011.

The above-identified application is hereby incorporated herein by reference in its entirety.

TECHNICAL FIELD

Aspects of the present application relate to electronic communications. More specifically, to a method and system for serialization and deserialization (SERDES) for inter-system communications.

BACKGROUND

Conventional methods and systems for inter-system communications can be costly and overly-complex. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for serialization and deserialization (SERDES) for inter-system communications, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "module" refer to functions than can be performed by one or more circuits. As utilized herein, the term "exemplary" means serving as a non-limiting example, instance, or illustration. As utilized herein, the terms "for example" and "e.g.," set off lists of one or more non-limiting examples, instances, or illustrations.

Figure 1:
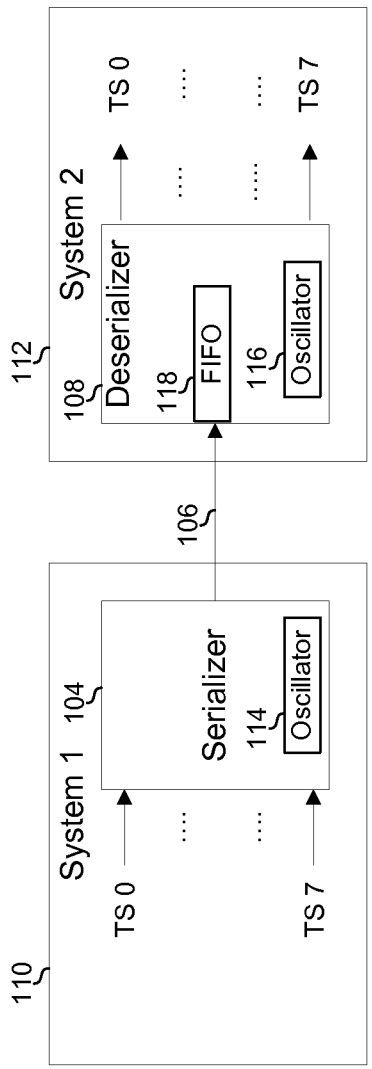
FIG. 1 depicts two systems which communicate via a serial channel, in accordance with an example implementation of this disclosure.

FIG. 1 depicts two systems which communicate via a serial channel, in accordance with an example implementation of this disclosure. Shown in FIG. 1 are systems 110 and 112 which communicate via a serial channel 106. In an example implementation, the systems 110 and 112 may each be integrated circuits residing on a common printed circuit board within a cable television or satellite television set-top box. In various other example implementations, the systems 110 and 112 may be ICs residing on separate PCBs and/or in separate devices (e.g., the system 110 may be in a satellite outdoor unit and the system 112 may be in a satellite indoor unit), or may be separate PCBs each comprising a plurality of ICs. Other scenarios are of course possible.

In the system 110, a plurality of transport streams TS0-TS7 are input, in parallel, to a serializer module 104. Note that although eight transport streams are used for illustration, aspects of this disclosure are applicable to any number of transport streams. The serializer 104 encapsulates packets of the transport streams into frames of a serial datastream and sends the frames over the channel 106. The deserializer 108 receives frames of the serial datastream and processes them to recover the packets of one or more of the transport streams TS0-TS7. Accordingly, to prevent dropped or lost packets, the rate at which the module 104 sends frames over the channel 106 must not exceed the maximum rate at which the module 108 can process the frames.

Also shown in FIG. 1, are an oscillator 114 and an oscillator 116 and a first-in-first-out buffer (FIFO) 118. Each of the oscillators 114 and 116 may comprise, for example, a voltage controlled oscillator, a phase-locked loop, and/or any other suitable circuitry for generating an oscillating signal. The FIFO 118 may be operable to buffer a serial datastream received via the channel 106.

Figure 2:
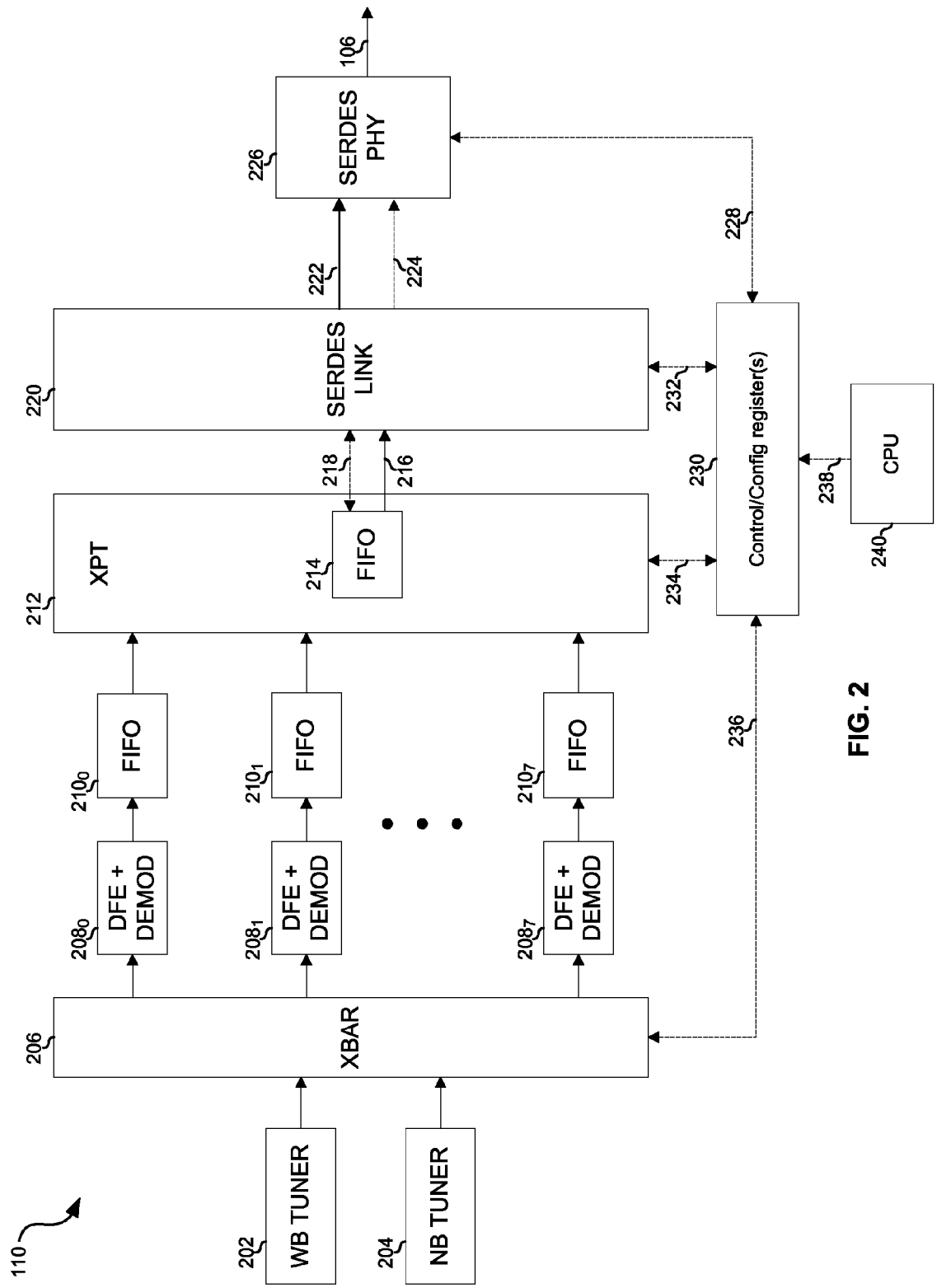
FIG. 2 depicts an example system operable to generate a serial datastream comprising multiple transport streams, in accordance with an example implementation of this disclosure.

FIG. 2 depicts an example system operable to generate a serial datastream comprising multiple transport streams, in accordance with an example implementation of this disclosure. Shown in FIG. 2 is an example implementation of the system 110 comprising a wideband tuner 202, a narrowband tuner 204, a digital crossbar 206, a plurality of modules $208_0$-$208_7$, a plurality of first-in-first-out buffers (FIFOs) $210_0$-$210_7$, a transport module 212 comprising FIFO 214, a SERDES link module 220, a SERDES physical layer (PHY) module 226, a register bank 230, and a central processing unit (CPU) 238.

The wideband tuner 202 may be operable to process (e.g., downconvert) a relatively-wide range of frequencies to select, for output to the crossbar 206, one or more channels that fall within that range. For example, the wideband tuner 202 may be operable to process an approximately 1 GHz-wide block of frequencies comprising the entire cable television spectrum or entire spectrum output by a satellite LNB. The narrowband tuner 204 may be operable to process (e.g., downconvert) a relatively-narrow range of frequencies to select one or more channels falling within that range for output to the crossbar 206. For example, at any given time, the narrowband tuner 204 may be operable to process only one or a few 6 or 8 MHz television channels. Having both the wideband tuner 202 and the narrowband tuner 204 may provide performance advantages as described, for example, in U.S. patent application Ser. No. 13/356,265, entitled "Method and Apparatus for an Energy-Efficient Receiver," which is hereby incorporated herein by reference in its entirety.

The digital crossbar 206 may be operable to select and convey any portion of the signal output by the WB tuner 202 and/or the signal output by the NB tuner 204 to any one or more of the modules $208_0$-$208_7$. The digital crossbar 206 may comprise filters, switches, and/or any other circuitry suitable for performing such selecting and conveying.

Each of the plurality of modules $208_0$-$208_7$ may be operable to perform digital front end (DFE) and demodulation functions. For example, each module $208_X$ (X being an integer between 0 and 7) may receive a 6 MHz or 8 MHz wide signal corresponding to a television channel, and may be operable to equalize, demodulate, decode, and/or error correct the signal to recover a transport stream. The recovered transport stream may be output to the corresponding FIFO $210_X$.

Each first-in-first-out buffer (FIFO) $210_X$ may be operable to buffer transport stream packets conveyed between a corresponding module $208_X$ and the transport module 212 so as to match the rate at which the module $208_X$ outputs packets to the rate at which the transport module $210_X$ accepts packets from the module $208_X$.

The transport module 212 may be operable to multiplex transport stream packets from the multiple FIFOs $210_0$-$210_7$ onto a single signal buffered by the FIFO 214. The FIFO 214 may match a rate at which the module 212 outputs multiplexed transport stream packets on signal 216 to the rate at which the SERDES link module 220 accepts the multiplexed transport stream packets on signal 216.

The SERDES Link module 220 may be operable to perform framing and other operations for generating a serial datastream that encapsulates the transport stream packets received from the FIFO 214. Details of an example implementation of the SERDES link module 220 are described below with reference to FIGS. 3-6.

The SERDES physical layer (PHY) module 226 may receive a digital serial datastream from the link module 220 and generate the appropriate signaling for transmitting the data stream over the channel 106. In this regard, the PHY module 226 may comprise line drivers, impedance matching circuits, and/or other analog circuitry.

The register bank 230 may comprise one or more memory cells for storing configuration information such as, for example, multiplexer control bit(s), counters, parameter values, gain settings, equalizer settings, etc.

The central processing unit (CPU) 240 may be operable to execute instructions to control configuration and/or operation of the system 110. Execution of such instructions may be based on and/or may configure the contents of the register bank 230.

In operation of an example implementation, a television signal may be received and one or more frequency bands of the television signal, comprising one or more television channels, may be downconverted and/or digitized by the tuner 202 and/or the tuner 204. The crossbar may select one or more channels of the selected frequency bands and convey the selected channel(s) to one or more of the modules $208_0$-$208_7$. The selecting and conveying may be controlled by the CPU 238 and/or the contents of the register bank 230. Each one of the modules $208_0$-$208_7$ that receives a signal from the crossbar 206 may then process the signal to recover transport streams packets carried therein, and convey the recovered transport stream packets to a corresponding one of the FIFOs $210_0$-$210_7$. The transport module 212 may multiplex the transport stream packets to generate signal 216, which may be buffered in the FIFO 214. The multiplexing may be controlled by the CPU 238 and/or the contents of the register bank 230. The link module 220 may then frame and/or otherwise process the multiplexed transport stream packets to generate a serial datastream suitably formatted for the deserializer 108 (FIG. 1). The size, contents, and/or other characteristics of the frames may be controlled by the CPU, based on the contents of the register bank 230, and/or based on characteristics of the transport stream packets. The PHY module 226 may process the serial datastream to generate symbols to be impressed on the channel 106.

Figure 3:
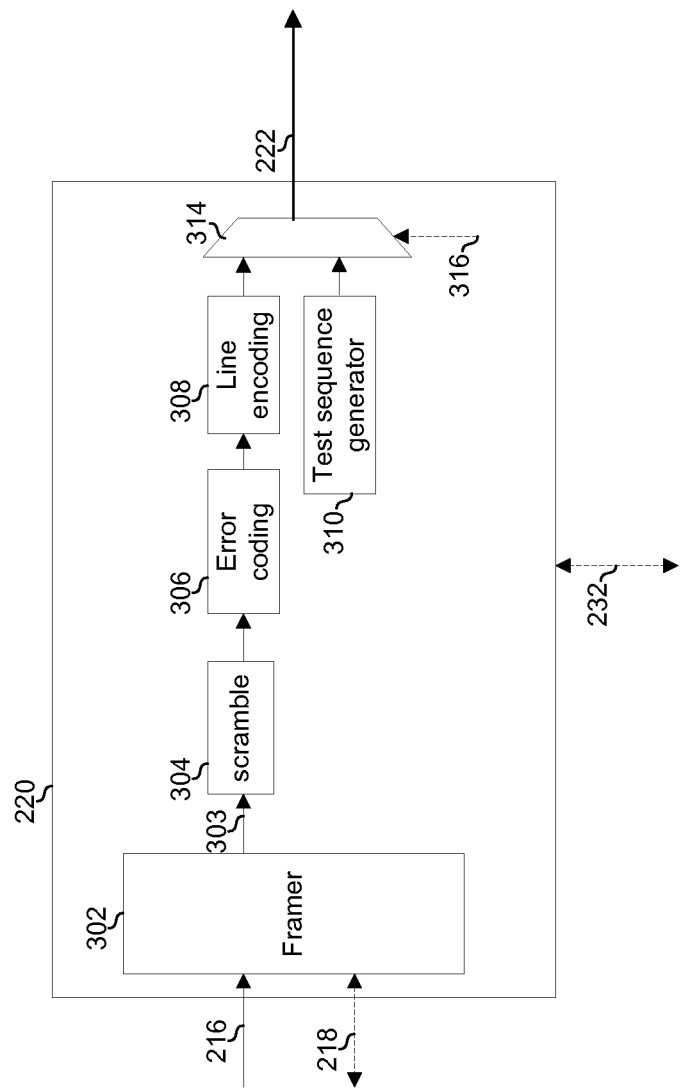
FIG. 3 depicts an example implementation of the SERDES Link module shown in FIG. 2.

FIG. 3 depicts an example implementation of the SERDES Link module shown in FIG. 2. The link module 220 comprises a framer module 302, a scrambling module 304, an error-coding module 306, a line encoding module 308, a test sequence generation module 310, and a multiplexer 314.

The framer module 302 may encapsulate transport stream packets received from the transport module 212 into frames to be transmitted as part of a serial datastream on the channel 106. An example implementation of the framer is described below with reference to FIGS. 4-6.

The scrambling module 304 may be operable to scramble the bits of a frame output by the framing module 302. The scrambling may be performed to, for example, avoid long runs of consecutive bits having the same value (either zero or one).

The error coding module 306 may manipulate the scrambled frame to enable error detection and/or correction at the receiver of the frame (e.g., at system 112). In an example implementation, Reed-Solomon encoding or the appending of a CRC checksum may be performed by the module 306.

The line encoding module 308 may manipulate the contents of frames output by module 306 to avoid the buildup of a DC offset on the channel 106.

The test sequence generation module 310 may generate test sequences for testing the system 110 and/or the system 112. For example, when a "test" mode bit of the register bank 230 is asserted, the control signals 232 and 316 may configure the multiplexer 314 to select the output of the module 310, otherwise the multiplexer 314 may be configured to select the output of the module 308.

In operation of an example implementation, a signal 216 comprising plurality of multiplexed transport stream packets may be received by the framer 302. The framer 302 may encapsulate the transport stream packets into frames for transmission as a serial datastream. The frames may be scrambled by the module 304, error-correction encoded by module 306, line encoded by module 208, and then multiplexed by the multiplexer 314, to form a signal 222.

Figure 4:
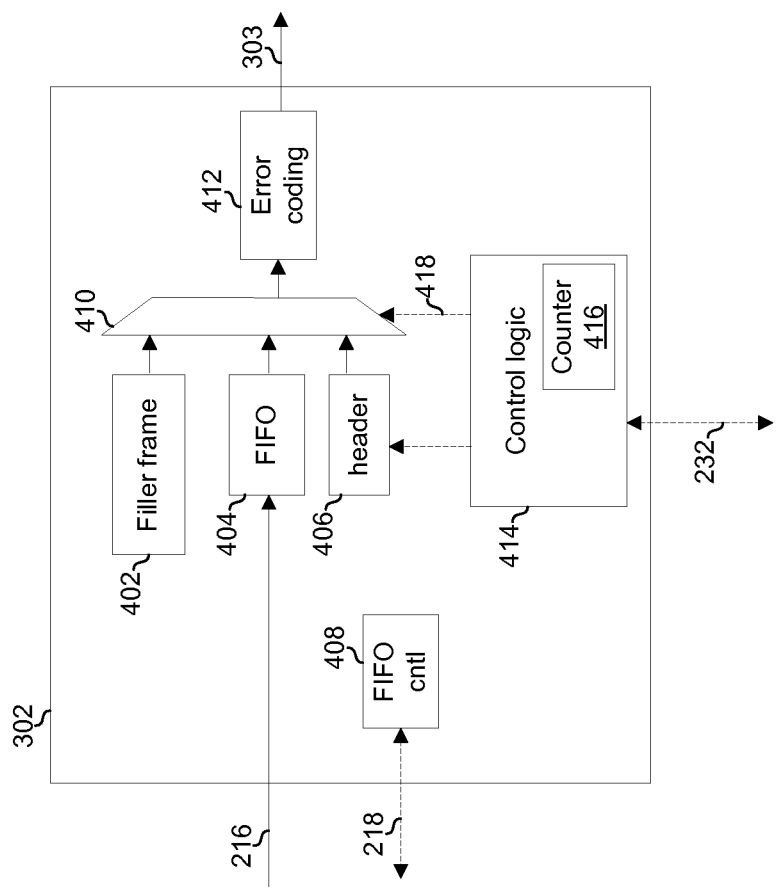
FIG. 4 depicts an example implementation of the framer module shown in FIG. 3.

FIG. 4 depicts an example implementation of the framer module shown in FIG. 3. The framer 302 comprises a filler frame module 402, a buffer 404, a header generation module 406, a FIFO control module 408, a multiplexer 410, an error correction module 412, and control logic module 414.

The filler frame module 402 may generate "filler" or "padding" bits for insertion into filler frames.

The FIFO 404 may buffer transport stream packets received via signal 216. In an example implementation, the FIFO 404 may occasionally or periodically buffer a transport stream packet while a filler frame is output to the error correction module 412. An example process for determining when to output such filler frames is described below with reference to FIG. 6.

The header generation module 406 may generate header bits to be prepended to frames that are to be transmitted over the serial link 106.

The FIFO control module 408 may control reads and/or writes to the FIFO 214 (FIG. 4) to rate-match reads and writes to the FIFO 214 so as to prevent overflows and underflows.

At any given time, the multiplexer 410 may select, based on the state of the control signal 418, one of its three inputs to be output to the error coding module 412.

The error coding module 412 may manipulate frames output by the multiplexer 410 to enable error detection and/or correction at the receiving system (e.g., system 112). In an example implementation, a CRC checksum may be added by the module 412.

The control logic 414 may configure the header module 406 and the multiplexer 410 based on, for example: one or more parameters conveyed from the register bank 230 via control signal 232, the value of a counter 416, and/or characteristics of the signal 216. Such characteristics may include, for example, whether or not a transport stream packet was received on the signal 216 during the current time interval.

Figure 5A:
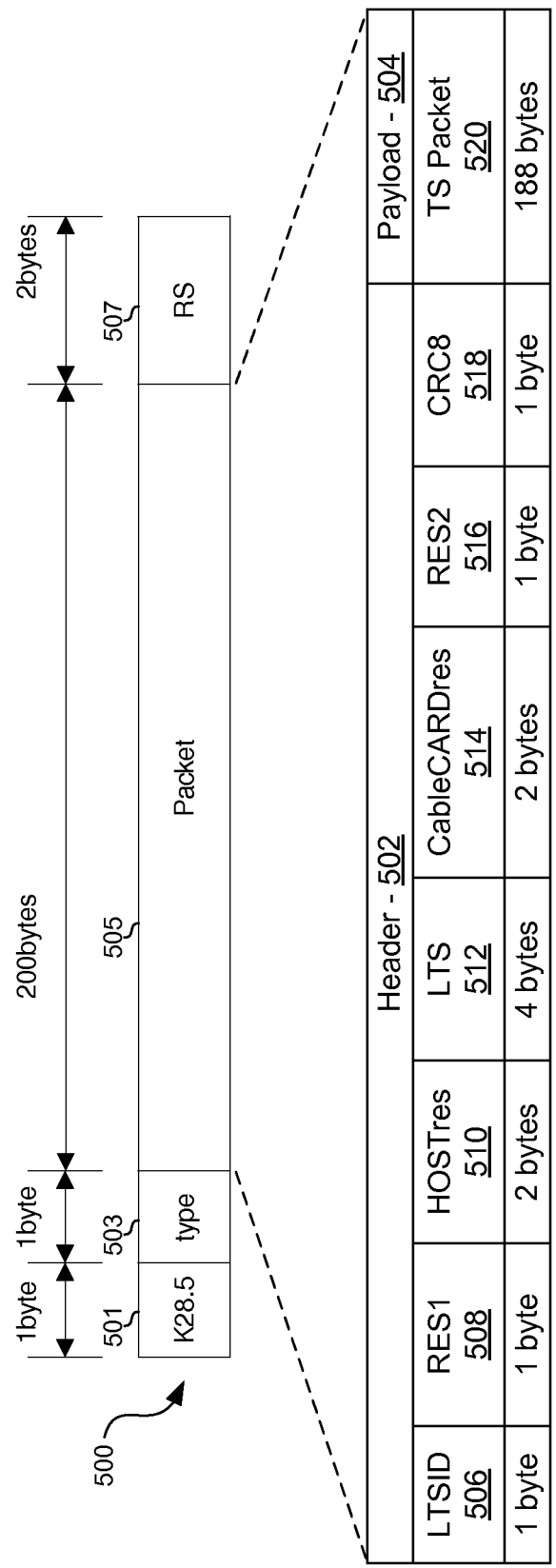
FIG. 5A depicts an example transport stream frame format, in accordance with an example implementation of this disclosure.

In operation, a transport stream frame, such as shown in FIG. 5A, may be generated as follows. First, the control logic configures the header module 406 to generate a transport stream frame header 502 (FIG. 5A) and configures the multiplexer 410 to output the header 502 to the module 412. Next the multiplexer 410 is configured to select the FIFO 404 such that a transport stream packet is output as the payload 504 (FIG. 5A) of the frame. Finally, the error coding module 412 manipulates the frame (e.g., adds a CRC checksum).

A filler frame may be generated in a similar manner. First, the control logic configures the header module 406 to generate a transport stream frame header 522 (FIG. 5B) and configures the multiplexer 410 to output the header 522 to the module 412. Next the multiplexer 410 is configured to select the filler module 402 such that a filler bits are output as the payload 524 (FIG. 5B) of the frame. The number of filler bits may depend on the contents of the register bank 230. Finally, the error coding module 412 manipulates the frame (e.g., adds a CRC checksum).

FIG. 5A depicts an example transport stream frame format, in accordance with an example implementation of this disclosure. The fields of the transport stream frame 500 are described in Tables 1 and 2 below.

TABLE 1

| Name | Bytes | Description |
| --- | --- | --- |
| K28.5 501 | 1 | K28.5 symbol to indicate packet boundary. |
| Type/Validity 503 | 1 | Frame could be a filler and/or have valid data. Bit [7] may indicate if the packet has valid data (1) or not (0) Bit [6] may indicate if it is a filler (0) or not (1) Bits [5:0] may indicate length of the frame in DW (4-bytes) |
| Packed stream packet 505 | 200 | See Table 2 |
| RS/CRC16 507 | 2 | Reed-Solomon check bytes for error detection and correction. In alternative CRC16 may be used. |

TABLE 2

| Name | Bytes | Description |
| --- | --- | --- |
| LTSID 506 | 1 | Transport stream ID: each packet in a packed transport stream may be tagged with the same unique LTSID to allow multiple TS's to be de-multiplexed correctly |
| RES1 508 | 1 | Reserved, default 0x0 |
| HOSTres 510 | 2 | Statistics/informational data (for future extension) |
| LTS 512 | 4 | Local time stamp (for future extension) |
| CableCARDres 514 | 2 | Reserved |
| RES2 516 | 1 | Reserved, default 0x0 |
| CRC8 518 | 1 | 8-bit CRC |
| Payload 520 | 188 | Payload Format: MPEG or DIRECTV TS Packet. MPEG TS payload may always be 188 bytes. In DIRECTV mode, only the first 130 bytes may be valid. The payload format may be configured by the host for each stream. |

Figure 5B:
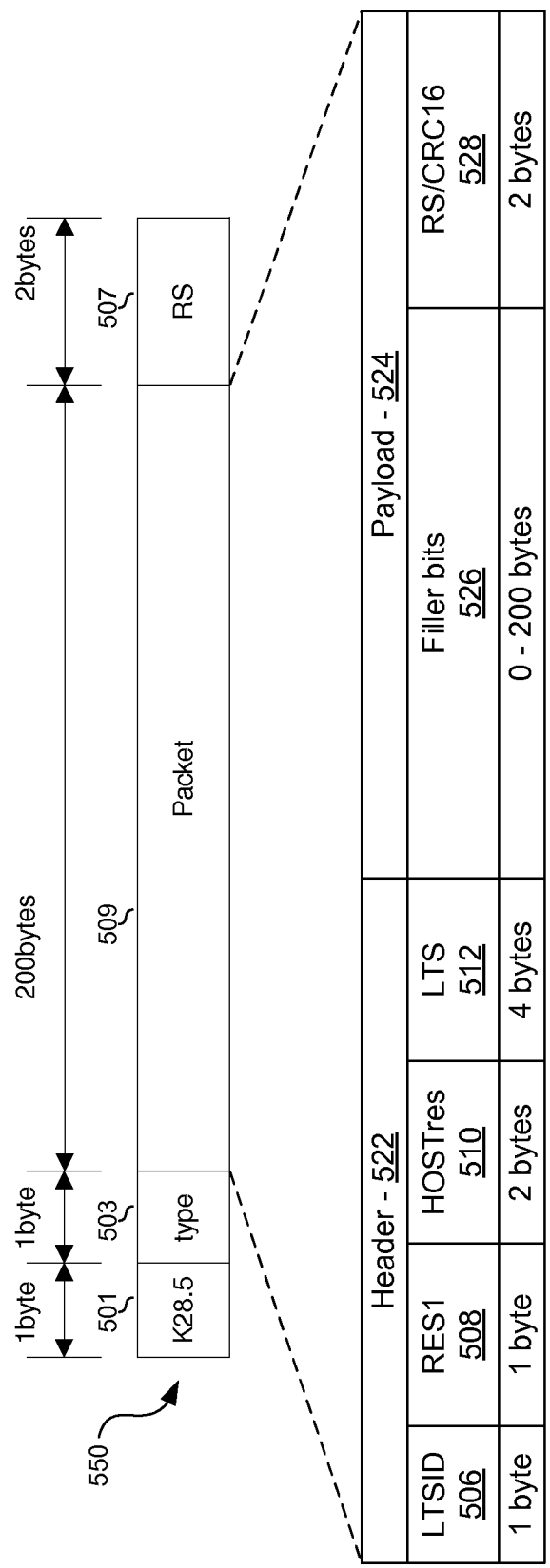
FIG. 5B depicts an example filler frame format, in accordance with an example implementation of this disclosure.

FIG. 5B depicts an example filler frame format, in accordance with an example implementation of this disclosure. The fields of the transport stream frame 500 are described in Tables 1 and 2 below.

TABLE 3

| Name | Bytes | Description |
| --- | --- | --- |
| K28.5 501 | 1 | K28.5 symbol to indicate packet boundary. |
| Type/Validity 503 | 1 | Frame could be a filler and/or have valid data. Bit [7] may indicate if the packet has valid data (1) or not (0) Bit [6] may indicate if it is a filler (0) or not (1) Bits [5:0] may indicate length of the frame in DW (4-bytes) |
| Payload 509 | 0 to 200 | Reserved, can range from, for example, 0 to 200 bytes, in, for example, increments of 4 bytes: 0, 4, 8, . . . , 200 |
| RS/CRC16 | 2 | Reed-Solomon check bytes for error detection and correction. CRC16 may be used as an alternative |

Figure 6:
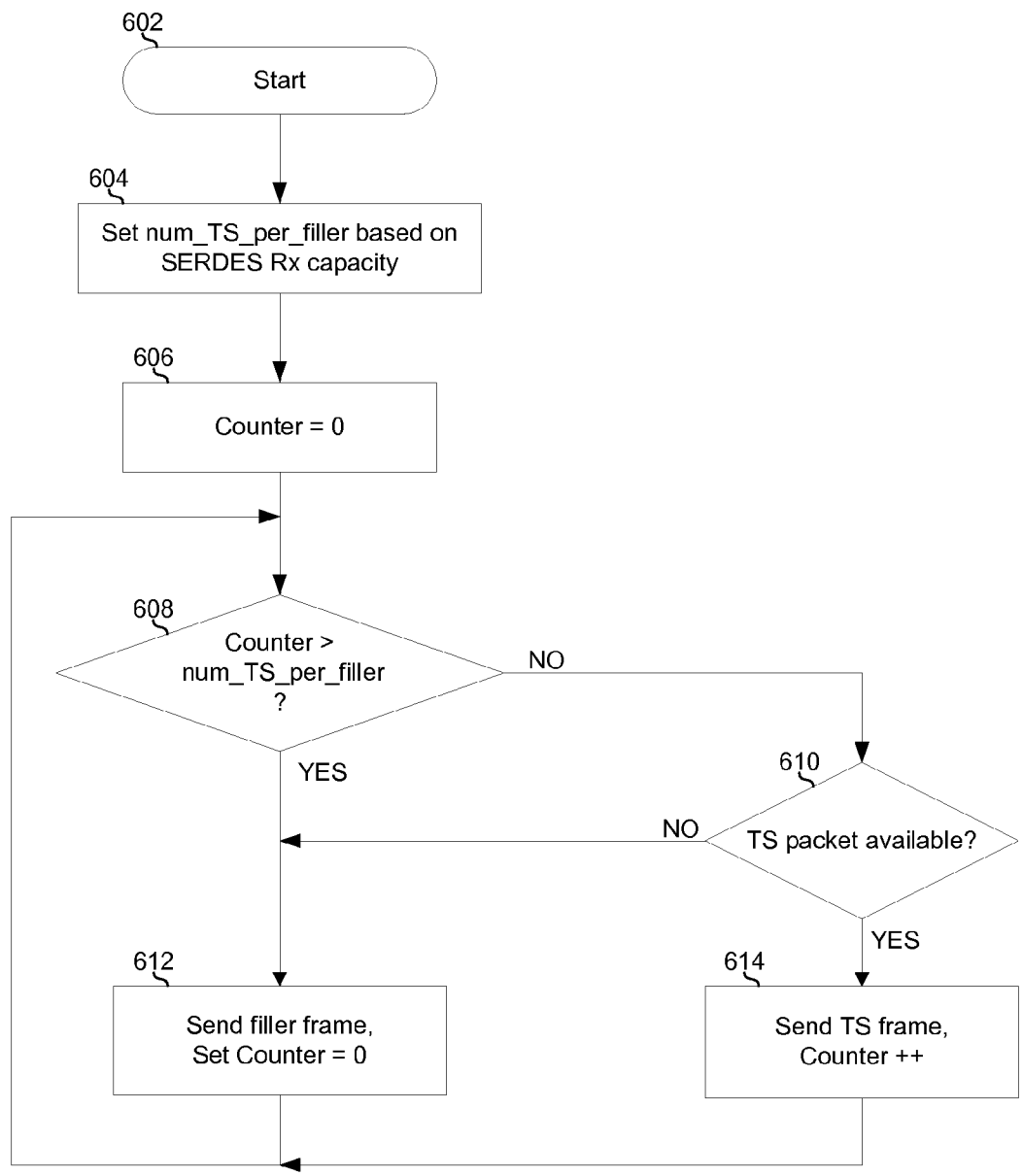
FIG. 6 depicts an example process for generating a serial datastream comprising multiple transport streams, in accordance with an example implementation of this disclosure.

FIG. 6 depicts an example process for generating a serial datastream comprising multiple transport streams, in accordance with an example implementation of this disclosure. The process may be executed for each frame to be generated by the framer module 302. The process begins with start block 602 and proceeds to block 604.

In block 604, the value of a parameter "num_TS_per_filler" is set. The value of num_TS_per_filler may be determined based on, for example: the rate at which the serializer 104 does, or can, generate transport stream frames and the rate at which the deserializer does, or can, process (e.g., decapsulate the frames to recover transport stream packets contained therein) the frames; a timing mismatch (e.g., phase and/or frequency mismatch) between the oscillator 114 and the oscillator 116; and/or the size of the FIFO 118 (e.g., how many bits the FIFO 118 can hold before overflowing). For example, where the oscillator 114 has a higher frequency than the oscillator 116, and/or where the FIFO 118 is relatively small, a relatively smaller value of num_TS_per_filler may be used. In this manner, since the filler frames may be discarded without being processed by the deserializer 108, each filler frame effectively provides the deserializer 108 with additional time to process previously-received TS packets.

The value of num_TS_per_filler may be stored in the register bank 230. After block 604, the process advances to block 606. The value of num_TS_per_filler may be preprogrammed and/or configured during run time of the serializer 104. For example, num_TS_per_filler may be changed corresponding to changes in the transport streams being multiplexed (e.g., after an end user changes the television channel it is consuming resulting in a change in the channels selected by the crossbar 206).

In block 606 the counter 416 is initialized to zero and the process advances to block 608.

In block 608 it is determined whether the value of the counter 416 is greater that the value of the parameter num_TS_per_filler. If so, the process advances to block 612.

In block 612, a filler frame 550 is generated and the counter 416 is reset to zero. After block 612, the process returns to block 608.

Returning to block 608, if the value of the counter 416 is not greater than the value of num_TS_per_filler, then the process advances to block 610.

In block 610, it is determined whether there is a TS packet available for inserting into the payload of a frame 500. If so, then the process advances to block 614.

In block 614, a transport stream frame 500 is generated and the counter 416 is incremented.

Returning to block 610, if there is no transport stream packet available (i.e., a transport stream packet is not buffered in FIFO 404), the process advances to block 612.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein for serialization and deserialization (SERDES) for inter-system communications.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a serializer comprising a framing circuit that in turn comprises header insertion circuitry, filler bits insertion circuitry, a buffer, and control circuitry, wherein:
said header insertion circuitry is operable to generate frame headers;
said filler bits insertion circuitry is operable to generate filler bits;
said buffer is operable to buffer bits of an input datastream;
said control circuitry is operable to select, at any given time, whether bits from said header insertion circuitry, bits from said filler bits insertion circuitry, or bits from said buffer are placed into a serial output stream; and
said selection is such that filler bits are periodically inserted into said output stream at times determined based on a value of a parameter stored in said serializer.

2. The system of claim 1, wherein said control circuitry is operable to determine said value of said parameter based on a timing mismatch between a first oscillator residing in said serializer and a second oscillator residing in a deserializer that receives said serial output stream.

3. The system of claim 1, wherein said control circuitry is operable to determine said value of said parameter during run time of said serializer.

4. The system of claim 1, wherein said control circuitry is operable to determine said value of said parameter based on a size of a buffer in a deserializer which receives said serial output stream.

5. The system of claim 1, wherein:
said framing circuit comprises a multiplexer; and
said selection comprises control of said multiplexer.

6. The system of claim 1, wherein a header output by said header insertion circuitry comprises one or more bits indicating whether a corresponding payload comprises filler bits, data bits, or both.

7. The system of claim 1, wherein said serializer comprises circuitry operable to digitize a band of frequencies that comprises a plurality of channels.

8. The system of claim 7, wherein said serializer comprises circuitry operable to select one or more of said channels and multiplex said selected one or more of said channels to generate said input datastream.

9. The system of claim 7, wherein said band of frequencies comprises the entire cable television band.

10. A method comprising:
performing in a serializer comprising a framing circuit that in turn comprises header insertion circuitry, filler frame insertion circuitry, a buffer, and control circuitry:
generating, by said header insertion circuitry, generate frame headers;
generating, by said filler bits insertion circuitry, filler bits;
storing, by said buffer, bits of an input datastream; and
at any given time, selecting, by said control circuitry, whether bits from said header insertion circuitry, bits from said filler frame insertion circuitry, or bits from said buffer are placed into a serial output stream, wherein said selection is such that filler bits are periodically inserted into said output stream at times determined based on a value of a parameter stored in said serializer.

11. The method of claim 10, comprising determining, by said control circuitry, said value of said parameter based on a timing mismatch between a first oscillator residing in said serializer and a second oscillator residing in a deserializer that receives said serial output stream.

12. The method of claim 10, comprising determining, by said control circuitry, said value of said parameter during run time of said serializer.

13. The method of claim 10, wherein said control circuitry is operable to determine said value of said parameter based on a size of a buffer in a deserializer which receives said serial output stream.

14. The method of claim 10, wherein:
said framing circuit comprises a multiplexer; and
said selecting comprises controlling said multiplexer.

15. The method of claim 10, wherein a header output by said header insertion circuitry comprises one or more bits indicating whether a corresponding payload comprises filler bits, data bits, or both.

16. The method of claim 10, comprising digitizing, by circuitry of said serializer, a band of frequencies that comprises a plurality of channels.

17. The method of claim 7, comprising:
selecting, by circuitry of said serializer, one or more transport streams received on said plurality of channels; and
multiplexing said selected one or more of said channels to generate said input datastream.

18. The method of claim 16, wherein said band of frequencies comprises the entire cable television band.

* * * * *